United States Patent [19]

Stikkers

[11] 4,165,466
[45] Aug. 21, 1979

[54] DRIVE APPARATUS FOR VEHICLE MOUNTED GENERATOR

[75] Inventor: Tieme C. Stikkers, Brookline Station, Mo.

[73] Assignee: Dayco Corporation, Dayton, Ohio

[21] Appl. No.: 800,490

[22] Filed: May 25, 1977

[51] Int. Cl.² ............................................. F16H 7/10
[52] U.S. Cl. ............................... 290/3; 74/242.11 C; 74/242.15 R; 322/42
[58] Field of Search ....................... 290/3, 1; 310/75 R, 310/75 C, 75 D; 105/49; 322/38, 40, 41, 42, 43; 74/13, 14, 242.11 C, 242.11 P, 242.15 R, 242.14 R

[56] References Cited

U.S. PATENT DOCUMENTS

| 731,382 | 6/1903 | McElroy | 322/42 |
|---|---|---|---|
| 732,239 | 6/1903 | Turbayne et al. | 322/43 X |
| 768,392 | 8/1904 | Moskowitz | 322/42 X |
| 1,319,066 | 10/1919 | Grob | 74/242.11 C |
| 1,389,463 | 8/1921 | Turbayne | 322/43 X |
| 2,743,679 | 5/1956 | Lofton | 74/242.11 C X |
| 3,306,121 | 2/1967 | Jenkins | 74/242.15 R |
| 3,702,570 | 11/1972 | Stikkers | 74/242.15 R |
| 3,924,483 | 12/1975 | Walker et al. | 74/242.15 R X |

Primary Examiner—B. Dobeck
Attorney, Agent, or Firm—Reuben Wolk

[57] ABSTRACT

A drive apparatus for a vehicle mounted generator is provided wherein such vehicle has a driver shaft and a driver sheave detachably fixed thereto with the drive apparatus comprising an adjustable pivot support supporting the generator on the vehicle, a driven sheave detachably fixed to the rotor of such generator, at least one belt operatively connected between the driver sheave and the driven sheave, and a device yieldingly moving the generator about the pivot support to thereby move the driven sheave away from the driver sheave and place a substantially constant yielding tension on the belt to assure that the driven sheave and generator are driven in an optimum manner.

16 Claims, 3 Drawing Figures

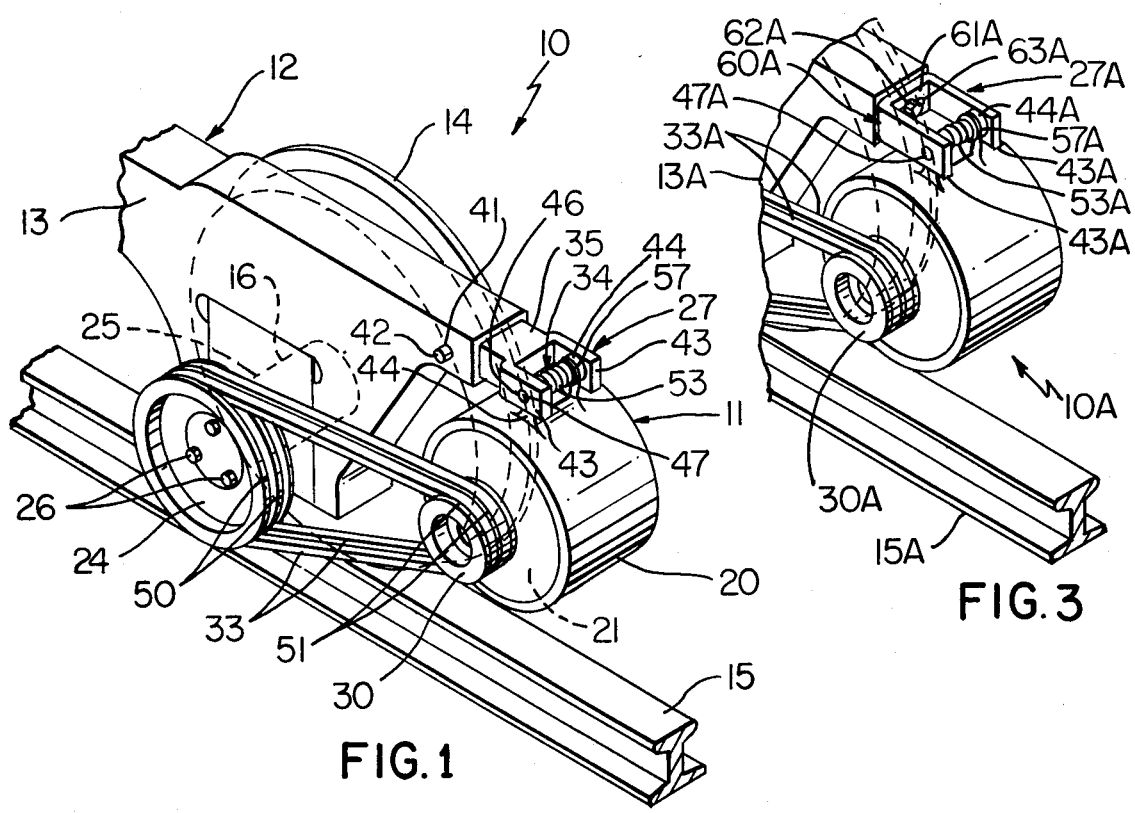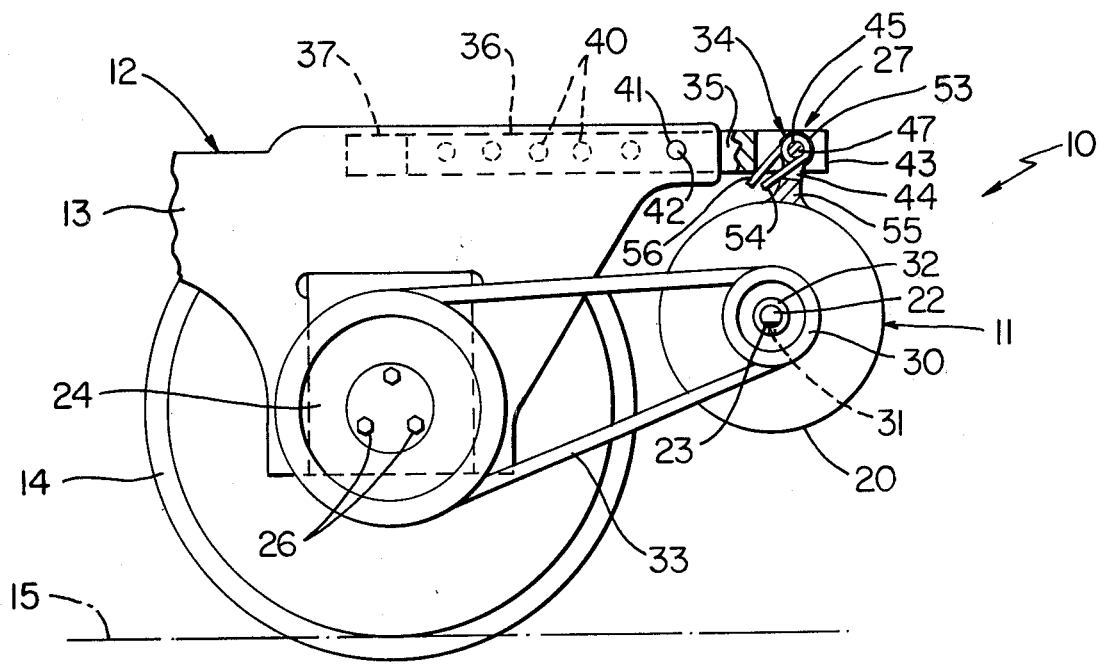

DRIVE APPARATUS FOR VEHICLE MOUNTED GENERATOR

BACKGROUND OF THE INVENTION

Various drive apparatus are in present use for driving generators and alternators of the type employed on vehicles such as railroad cars, and the like. However these present drive apparatus are deficient in one or more respects whereby with certain ones of these apparatus it is necessary to remove wheels from the railroad cars to install endless belts used to drive an associated generator, with others of these present apparatus there is often excessive misalignment of belt sheaves thereby imposing damaging side loads on both the belts and sheaves, and with still others of these present apparatus it is difficult to maintain a substantially constant tension on the associated drive belts.

SUMMARY

It is a feature of this invention to provide a simple and economical drive apparatus of the character mentioned which basically eliminates the above-mentioned deficiencies.

Another feature of this invention is to provide a drive apparatus of the character mentioned which utilizes endless elastomeric belts.

Another feature of this invention is to provide a drive apparatus of the character mentioned particularly adapted for use in driving generators on railroad cars, or the like.

Another feature of this invention is to provide a drive apparatus for a vehicle mounted generator wherein such vehicle has a driver shaft and a driver sheave detachably fixed thereto with the drive apparatus comprising an adjustable pivot support means supporting the generator on the vehicle, a driven sheave detachably fixed to the rotor of such generator, belt means operatively connected between the driver sheave and driven sheave, and means yieldingly moving the generator about the pivot support means to thereby move the driven sheave away from the driver sheave and place a substantially constant yielding tension on the belt means to assure that the driven sheave and generator are driven in an optimum manner.

Accordingly, it is an object of this invention to provide a drive apparatus of the character mentioned having one or more of the novel features set forth above or hereinafter shown or described.

Other details, features, objects, uses, and advantages of this invention will become apparent from the embodiments thereof presented in the accompanying specification, claims, and drawing.

BRIEF DESCRIPTION OF THE DRAWING

The accompanying drawing shows a present preferred embodiment of this invention, in which FIG. 1 is a fragmentary perspective view illustrating one exemplary embodiment of the drive apparatus of this invention employed at one end of a typical railroad car;

FIG. 2 is a side view with parts in elevation, parts in cross section, and parts broken away of the drive apparatus illustrated in FIG. 1; and FIG. 3 is a view similar to FIG. 1 illustrating another exemplary embodiment of this invention minus the driver sheave and adjoining structure.

DESCRIPTION OF ILLUSTRATED EMBODIMENT

FIG. 1 of the drawing illustrates an exemplary embodiment of the drive apparatus of this invention which is designated generally by the reference numeral 10 for driving an electrical generator or alternator. This is carried on a vehicle, designated by the reference numeral 12, which may be in the form of a railway car, caboose, etc. The vehicle 12 comprises a frame structure 13 having wheels 14 (only one wheel is shown in this disclosure) suitably rotatably mounted thereon, and the wheels 14 are adapted to roll on a conventional track 15. An axle 16 extends between and is fixed to an associated pair of wheels 14 of the vehicle 12 for rotation therewith as the vehicle 12 moves along the track 15 in the usual manner, and the axle 16 serves as a rotatable driver shaft for imparting rotary motion to the generator 11.

The generator 11 has an outer housing 20 and a rotor 21 disposed within the outer housing and provided with a shaft 22 extending from one end thereof. The shaft 22 has a flattened surface 23 on one side of its outer portion or a keyway and key for a purpose to be subsequently described.

The vehicle 12 has a roller bearing end cap (not shown) on the terminal end portion 25 of its axle 16 which rotates with such axle or driver shaft 16. A driver sheave 24 having an integral end cap is suitably detachably fixed to the terminal end portion 25 of axle 16 in place of such end cap. A plurality of threaded bolts 26 are employed for fastening the driver sheave 24 on position. The driver sheave 24 is disposed outwardly of the frame structure 13 and is readily accessible.

The drive apparatus 10 is of simple construction and comprises adjustable pivot support means designated generally by the reference numeral 27 for adjustably supporting the generator 11 on the vehicle 12 as will be described in detail subsequently and such apparatus 10 also includes a driven sheave 30 detachably fixed to the shaft 22 of rotor 21. In this example of the invention a threaded set screw 31 is employed to detachably fix the sheave 30 to the shaft 22 with the set screw 31 being threaded through a threaded opening in a flange 32 of the sheave 30 and having a terminal end which engages the flattened surface 23 of shaft 22 to assure the sheave 30 will not rotate relative to the shaft 22. However, it will be appreciated that other means may be employed to detachably fix the sheave 30 to the shaft 22. For example, a nut and flat washer may be used on a shaft 22 having a threaded end portion and with such shaft and sheave being provided with cooperating keyways and a key.

The apparatus 10 employs belt means shown as a plurality of two endless power transmission belts each designated generally by the reference numeral 33 and such belts are operatively connected between the driver sheave 24 and the driven sheave 30. The apparatus 10 also has means yieldingly moving the generator 11 about its pivot support means 27 and such means yieldingly moving is designated generally by the reference numeral 34; and, the means 34 moves the generator 11 and thus driven sheave 30 away from the driver sheave 24 thereby placing a substantially constant yielding tension on the belts 33 to assure that the driven sheave 30 and generator are driven in an optimum manner without or free of excessive loads on the belts 33.

The apparatus 10 comprises a telescoping member 35 which has the previously mentioned pivot support means 27 provided at its outer end. The member 35 is adapted to be received in telescoping relation within the frame structure 13 and in particular an inner portion 36 of the member 35 is adapted to be received in an elongate opening 37 in the frame structure 13. The opening 37 is of rectangular peripheral outline and it will be seen that the member 35 has a plurality of cylindrical bores or passages 40 provided in its inner portion 36 and the bores 40 are disposed in parallel spaced relation transverse the longitudinal axis of member 35. Each bore 40 is adapted to be aligned with a pair of axially aligned openings 41 provided in the frame structure 13 and a pin 42 is adapted to be inserted therethrough whereby member 35 may be telescoped to a plurality of positions. With this structure it is a simple matter to telescope member 35 so that support means 27 and generator 11 are at any desired location whereupon pin 42 is inserted through the openings 40 and 41 corresponding to such desired location. The positioning of the telescoping member 35 and use of the means yieldingly moving 34 cooperate to provide the desired uniform tension or loading of the belts 33.

The telescoping member 35 has a bifurcate end defined by a pair of spaced parallel legs 43 and the generator 11 has lug means shown herein as a pair of spaced parallel lugs 44 extending from the housing 20. It will be appreciated that only a single lug 44 may be provided as will be described subsequently. The lugs 44 are defined as an integral part of housing 20 and may be integrally defined in such housing so that the housing and lugs comprise a single-piece structure.

The lugs 44 have opening means therein defined by an opening 45 in each lug 44 and the openings 45 are disposed in axially aligned relation with a common central axis through openings 45 being disposed parallel to the generator shaft 22. The legs 43 defining the bifurcate end of the telescoping member 35 have coaxially aligned openings 46 therein and the pivot support means 27 has a pin 47 which is adapted to extend through the openings 45 and 46 and support the housing 20 on the telescoping member 35. In particular, it will be seen that the pin 47 engages cylindrical surfaces of the lugs 44 and arms 43 which define openings 45 and 46 respectively and thereby support the generator 11 in a pendulum-like or suspended relation at the terminal outer end of the telescoping member 35.

Each of the sheaves 24 and 30 has a corresponding plurality of annular grooves therein and in this example the sheave 24 has a plurality of two grooves 50 defined therein while the sheave 30 also has a plurality of two grooves 51. Each groove 50 and 51 is defined by symmetrically disposed radially outwardly diverging side surfaces interconnected at the bottom edges thereof by a right circular cylindrical surface and as is well known in the art; the grooves 50 and 51 are particularly adapted to receive endless belts 33 therein with the belts 33 being of trapezoidal cross-sectional outline whereby such belts are in the form of so-called V-belts. The V-belts 33 may be made of any suitable material known in the art, are of known construction, and are preferably made of elastomeric materials provided with reinforcement, as desired.

The apparatus 10 has the means yieldingly moving the generator and as previously mentioned such means is designated by the reference numeral 34. The means 34 is preferably in the form of torsion spring means and in particular is in the form of mechanical torsion spring which is designated by the reference numeral 53. The torsion spring 53 has one end portion 54 engaging an integral web structure 55 of housing 20 disposed between lugs 44 and an opposite end 56 engaging the telescoping member 35 so as to impart a substantially constant yielding force against the housing 20 of the generator 11 and thereby provide a substantially constant tension in the V-belts 33. The torsion spring 53 of this example imparts a force on the generator 11 which tends to rotate same counter-clockwise as viewed in FIG. 2.

In this disclosure of the invention a mechanical torsion spring 53 has been illustrated and described for urging generator 11 in a yielding manner so that the sheave 30 carried on the rotor 21 is moved away from the driver sheave 24; however, it is to be understood that any suitable torsion, compression, or tension spring means may be employed including pneumatic spring means, hydraulic spring means, or the like.

In this disclosure of the invention a plurality of two belts 33 are shown operatively connected between the sheaves 24 and 30; however, it will be appreciated that any desired number of belts may be employed and the required grooves provided in the driver sheave and driven sheave. For example, only one belt may be employed or more than two belts may be employed.

It will also be appreciated that belts other than V-belts may be used; however, regardless of the type belt used the drive apparatus of this invention assures that belts thereof operate under substantially constant yielding tension whereby such belts operate with optimum efficiency.

The spaced lugs 44 have a dimension across their outside surfaces which is measured parallel to the axis of the pin 47 which is less than the corresponding dimension between the inside surfaces of the arms 43. This enables controlled thickness washers 57 to be used between one or both of such outside surfaces and the inside surfaces of one or both arms 43 and around shaft 43 to position the lugs 44 along pin 47 whereby sheave 30 may be aligned with its grooves in the same planes as the grooves of sheave 24. The controlled thickness washers 57 comprise adjusting means of the adjustable pivot support means 27 enabling alignment of the generator and its driven sheave with the driver sheave.

It will also be appreciated that the simple pendulum-like or suspended mounting of generator 11 makes it possible, if desired, to install a simple extension (not shown) on shaft 22 for mounting sheave 30 to assure precision alignment of belts 33. Such as extension would be used in addition to or in lieu of washers 57 described above.

As mentioned earlier, a single central lug 44 of substantial axial thickness may also be provided on housing 20, instead of the two lugs 44, and by disposing controlled thickness annular washers 57 on the pin 47 on opposite sides of the central lug and using a modified torsion spring, i.e., a spring of less axial height measured parallel to the axis of pin 47, the generator 11 may be positioned by sliding its lug along pin 47 within predetermined limits of sliding so that the sheave 30 is precisely aligned with sheave 24 and the belts 33 operate in an untwisted manner in a pair of parallel planes.

Another exemplary embodiment of the drive apparatus of this invention is illustrated in FIG. 3 of the drawing. The drive apparatus illustrated in FIG. 3 is very similar to the drive apparatus 10; therefore, such apparatus will be designated by the reference numeral 10A and representative parts of such apparatus which are similar to corresponding parts of the apparatus 10 will be designated in the drawing by the same reference numerals as in the apparatus 10, whether or not such component parts are mentioned in the specification, followed by the latter designation A and not described again in detail. Only component parts of the drive apparatus 10A which are substantially different from corresponding parts of the apparatus 10 will be designated by a new reference numeral also followed by the letter designation A and described in detail.

The drive apparatus 10A in FIG. 3 instead of having a telescoping member supporting its pivot support means 27A has a U-shaped bracket 60A defined by a bight 61A and a pair of spaced parallel legs which extend from opposite ends of the bight 61A and such legs are designated by the reference numeral 43A and will also be referred to as arms 43A.

The bracket 60A may be fixed by any suitable means known in the art to the frame structure 13A and in this example of the invention a threaded bolt 62A is provided and is threadedly received in a cooperating threaded opening (not shown) in the frame structure to hold the U-shaped bracket 60A in position. The bracket 61A has an elongated slot 63A provided in its bight 61A and the slot is disposed so that it extends parallel to a pin 47A which extends through openings in the generator lugs 44A and arms 43A. The elongated slot 63A allows movement of the U-shaped bracket 60A on the frame structure 13 and such slot 63A cooperates with washers 57A to enable the sheave 30A to be precisely aligned with its driver sheave 24A (not shown) so that the belts 33A operate in their sheaves in an untwisted manner and in a pair of parallel planes. The slot 63A, bolt 62A, and washers 57A comprise the adjusting means of the adjustable pivot support means.

The bracket 60A may also be cast as an integral part of the frame structure 13A. In addition, the bracket 60A instead of being fixed in position by a threaded bolt may be fixed in position by any other suitable means such as welding in position after precisely aligning such bracket so that the sheave 30A is precisely aligned (in the manner previously mentioned) with its driver sheave.

The apparatus 10A also is shown employing a torsion spring 53A; however, other embodiments of the spring means may be employed as will be discussed subsequently.

It will also be appreciated that an existing frame structure may be modified to fix a bracket 60A thereon as well as employ a modified telescoping member which would be similar to member 35 and used therewith.

In this disclosure of the invention a mechanical torsion spring such as spring 53 has been illustrated and described in the apparatus 10 for urging its generator in a yielding manner so that the sheave 30 carried on the rotor 21 is moved away from the driver sheave 24; however, it is to be understood that any suitable torsion spring means may be employed in both the apparatus 10 and 10A and as mentioned earlier in connection with apparatus 10.

While present exemplary embodiments of this invention, and methods of practicing the same, have been illustrated and described, it will be recognized that this invention may be otherwise variously embodied and practiced within the scope of the following claims.

What is claimed is:

1. In a vehicle having a frame structure having wheels suitably rotatably mounted thereon; an axle extending between and fixed to an associated pair of wheels for rotation therewith, said axle serving as a rotatable driver shaft; an electrical generator provided with an outer housing and a rotor within said housing; and a drive apparatus for said generator comprising a driver sheave carried and driven by said driver shaft, a driven sheave fixed to said rotor, and belt means operatively connected between said drive sheave and said driven sheave; the improvement in said apparatus comprising, a telescoping member adapted to be received in telescoping relation within said frame structure; adjustable pivot support means supporting said generator on said vehicle, said adjustable pivot support means comprising a pin carried by said telescoping member, and lug means on said outer housing having opening means therein for receiving said pin therethrough; said adjustable pivot support means enabling alignment of said generator so that said driven sheave is precisely aligned with said driver sheave; and torsion spring means yieldingly moving said generator about its pivot support means thereby moving said driven sheave away from said driver sheave and placing a substantially constant yielding tension on said belt means to assure said driven sheave and generator are driven in an optimum manner.

2. In a vehicle as set forth in claim 1 the further improvement comprising a support structure affixed to said frame structure and wherein said adjustable pivot support means comprises, a pin carried by said support structure, lug means on said outer housing having opening means therein for receiving said pin therethrough, and washer means disposed around said pin while engaging and aligning said lug means and thus said generator.

3. In a vehicle as set forth in claim 2 the further improvement in said apparatus wherein said lug means is disposed in the upper portion of said outer housing and said pin engages cylindrical surfaces defining said opening means and thereby supports said housing and generator in suspended relation therebeneath.

4. In a vehicle as set forth in claim 1 the further improvement in said apparatus comprising means for selectively positioning said telescoping member in a plurality of positions and wherein said telescoping member has a bifurcate end, said lug means comprises a pair of spaced lugs fixed to said outer housing, and said opening means comprises a pair of coaxial bores in said lugs, said bores being adapted to receive said pin therethrough.

5. In a vehicle as set forth in claim 1 the further improvement in said apparatus wherein said belt means is defined as elastomeric endless belt means.

6. In a vehicle as set forth in claim 5 the further improvement in said apparatus wherein said elastomeric endless belt means comprises V-belt means of trapezoidal cross-sectional outline.

7. In a vehicle as set forth in claim 1 the further improvement in said apparatus wherein each of said sheaves has a corresponding plurality of annular grooves disposed in parallel relation and said belt means comprises a plurality of endless elastomeric V-belts corresponding in number to the number of annular grooves in each of said sheaves.

8. In a vehicle as set forth in claim 1 the further improvement in said apparatus wherein said driver sheave is suitably detachably fixed to the terminal end portion of said driver shaft and wherein said driver sheave is disposed outwardly of said frame structure.

9. In a railroad vehicle having a frame structure having wheels suitably rotatably mounted thereon; an axle extending between and fixed to an associated pair of wheels for rotation therewith, said axle serving as a rotatable driver shaft; an electrical generator provided with an outer housing and a rotor within said housing; and a drive apparatus for said generator comprising a driver sheave carried and driven by said driver shaft, a driven sheave fixed to said rotor, and a plurality of endless belts each made primarily of elastomeric material operatively connected between said driver sheave and said driven sheave; the improvement in said apparatus comprising, a telescoping member adapted to be received in telescoping relation within said frame structure; pivot support means supporting said generator on said vehicle, said pivot support means comprising a pin carried by said telescoping member, and lug means on said outer housing having opening means therein for receiving said pin therethrough, said pin supporting said generator in a pendelum-like manner therebeneath; and torsion spring means yieldingly rotating said generator about its pivot support means thereby moving said driven sheave away from said driver sheave and placing a substantially constant yielding tension on said belts to assure said driven sheave and generator are driven in an optimum manner.

10. In a vehicle as set forth in claim 7 the further improvement in said apparatus comprising means for selectively positioning said telescoping member in a plurality of positions.

11. In a vehicle as set forth in claim 10 the further improvement in said apparatus wherein said telescoping member has a bifurcate end, said lug means comprises a pair of spaced legs fixed to said outer housing, and said opening means comprises a pair of coaxial bores in said lugs, said bores being adapted to receive said pin therethrough.

12. In a vehicle as set forth in claim 9 the further improvement in said apparatus wherein each of said sheaves has a plurality of annular grooves defined therein, said plurality of grooves in each sheave corresponding in number to said plurality of endless belts.

13. In a vehicle as set forth in claim 11 the further improvement in said apparatus wherein said lug means is defined in the upper portion of said outer housing as an integral part thereof.

14. In a vehicle as set forth in claim 9 the further improvement in said apparatus wherein said elastomeric endless belts comprise V-belts of trapezoidal cross-sectional outline.

15. In a vehicle as set forth in claim 9 the further improvement in said apparatus comprising means for sliding said driven sheave axially along a central axis thereof to thereby precisely position said driven sheave relative to said driver sheave.

16. In a vehicle as set forth in claim 9 the further improvement in said apparatus wherein said driver sheave is suitably detatchably fixed to the terminal end portion of said driver shaft and wherein said driver sheave is disposed outwardly of said frame structure.

* * * * *